US012680147B2

(12) United States Patent (10) Patent No.: US 12,680,147 B2

Mitsunobu et al. (45) Date of Patent: Jul. 14, 2026

(54) PLATED STEEL SHEET

(71) Applicant: NIPPON STEEL CORPORATION,
Tokyo (JP)

(72) Inventors: Takuya Mitsunobu, Tokyo (JP);
Hiroshi Takebayashi, Tokyo (JP)

(73) Assignee: NIPPON STEEL CORPORATION,
Tokyo (JP)

( * ) Notice: Subject to any disclaimer, the term of this
patent is extended or adjusted under 35
U.S.C. 154(b) by 0 days.

(21) Appl. No.: 18/714,939

(22) PCT Filed: Dec. 21, 2022

(86) PCT No.: PCT/JP2022/047088
§ 371 (c)(1),
(2) Date: May 30, 2024

(87) PCT Pub. No.: WO2023/132237

PCT Pub. Date: Jul. 13, 2023

(65) Prior Publication Data

US 2025/0027186 A1 Jan. 23, 2025

(30) Foreign Application Priority Data

Jan. 6, 2022 (JP) ................................. 2022-001155

(51) Int. Cl.
C22C 18/04 (2006.01)
B32B 15/01 (2006.01)
(Continued)

(52) U.S. Cl.
CPC ............ C22C 18/04 (2013.01); B32B 15/013
(2013.01); B32B 15/04 (2013.01); B32B
15/043 (2013.01);
(Continued)

(58) Field of Classification Search
CPC ..... C22C 18/04; C22C 38/002; C22C 38/005;
C22C 38/008; C22C 38/02; C22C 38/04;
C22C 38/06; C22C 38/08; C22C 38/10;
C22C 38/12; C22C 38/14; C22C 38/16;
C22C 38/34; C22C 38/38; C22C 38/60;
(Continued)

(56) References Cited

U.S. PATENT DOCUMENTS 6,413,642 B1 * 7/2002 Wegner ................ C08G 18/792
427/407.1
8,021,497 B2 9/2011 Fleischanderl et al.
(Continued)

FOREIGN PATENT DOCUMENTS

AT 412 878 B 8/2005
JP 4-21753 A 1/1992
(Continued)

*Primary Examiner* — Michael E. La Villa
(74) *Attorney, Agent, or Firm* — Birch, Stewart, Kolasch
& Birch, LLP

(57) ABSTRACT

Provided is a plated steel sheet comprising a base steel sheet
and a plating layer formed on a surface of the base steel
sheet, wherein the plating layer has a predetermined chemi-
cal composition, and when measuring the plating layer by
glow discharge spectroscopy (GDS), a ratio of "Al concen-
tration at center of plating layer"/"Al concentration at posi-
tion of plating layer where Fe concentration is 50% of base
steel sheet" is 0.10 to 1.50.

1 Claim, 1 Drawing Sheet

( a )

( b )

(51) Int. Cl.

| | |
|---|---|
| *B32B 15/04* | (2006.01) |
| *B32B 15/18* | (2006.01) |
| *B32B 15/20* | (2006.01) |
| *C21D 9/46* | (2006.01) |
| *C22C 18/00* | (2006.01) |
| *C23C 2/02* | (2006.01) |
| *C23C 2/06* | (2006.01) |
| *C23C 2/26* | (2006.01) |
| *C23C 2/28* | (2006.01) |
| *C23C 2/40* | (2006.01) |
| *C23C 30/00* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/10* | (2006.01) |
| *C22C 38/12* | (2006.01) |
| *C22C 38/14* | (2006.01) |
| *C22C 38/16* | (2006.01) |
| *C22C 38/34* | (2006.01) |
| *C22C 38/38* | (2006.01) |
| *C22C 38/60* | (2006.01) |

(52) U.S. Cl.
CPC ............. *B32B 15/18* (2013.01); *B32B 15/20* (2013.01); *C21D 9/46* (2013.01); *C22C 18/00* (2013.01); *C23C 2/02* (2013.01); *C23C 2/0224* (2022.08); *C23C 2/024* (2022.08); *C23C 2/06* (2013.01); *C23C 2/26* (2013.01); *C23C 2/28* (2013.01); *C23C 2/29* (2022.08); *C23C 2/40* (2013.01); *C23C 30/00* (2013.01); *C23C 30/005* (2013.01); *B32B 2311/20* (2013.01); *B32B 2311/30* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/34* (2013.01); *C22C 38/38* (2013.01); *C22C 38/60* (2013.01); *Y10T 428/12799* (2015.01); *Y10T 428/12972* (2015.01); *Y10T 428/12979* (2015.01)

(58) Field of Classification Search
CPC ....... C22C 18/00; B32B 15/013; B32B 15/04; B32B 15/043; B32B 15/18; B32B 15/20; B32B 2311/20; B32B 2311/30; C21D 9/46; C23C 2/02; C23C 2/0224; C23C 2/024; C23C 2/06; C23C 2/26; C23C 2/28; C23C 2/29; C23C 2/40; C23C 30/00; C23C 30/005; Y10T 428/12799; Y10T 428/12972; Y10T 428/12979
See application file for complete search history.

(56) References Cited

U.S. PATENT DOCUMENTS

| | | | |
|---|---|---|---|
| 2010/0055344 A1 | 3/2010 | Ostwald et al. | |
| 2018/0243853 A1 | 8/2018 | Yoshinaga et al. | |
| 2020/0087747 A1* | 3/2020 | Kim .......................... | C23C 2/29 |
| 2022/0049330 A1 | 2/2022 | Tanaka et al. | |

FOREIGN PATENT DOCUMENTS

| | | | |
|---|---|---|---|
| JP | 2002-105614 A | 4/2002 | |
| JP | 2009-537698 A | 10/2009 | |
| JP | 2017-47475 A | 3/2017 | |
| WO | WO 2020/130079 A1 | 6/2020 | |

* cited by examiner ( a )
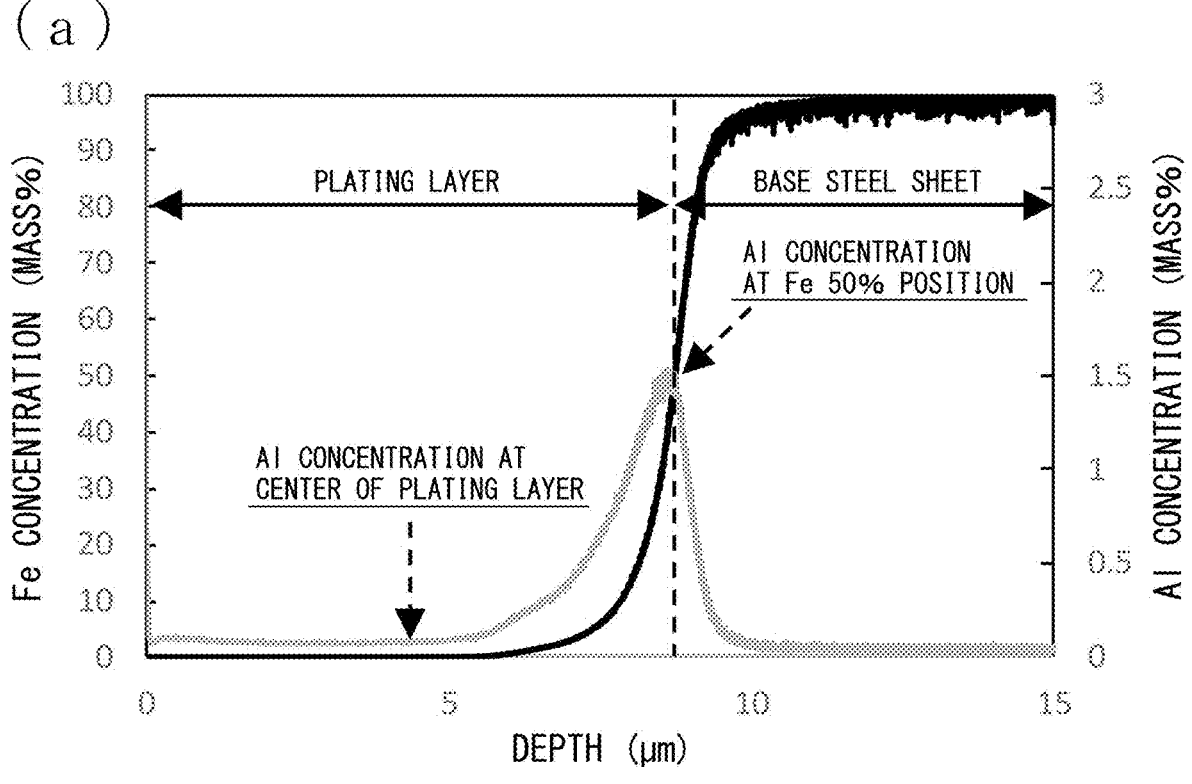
( b )
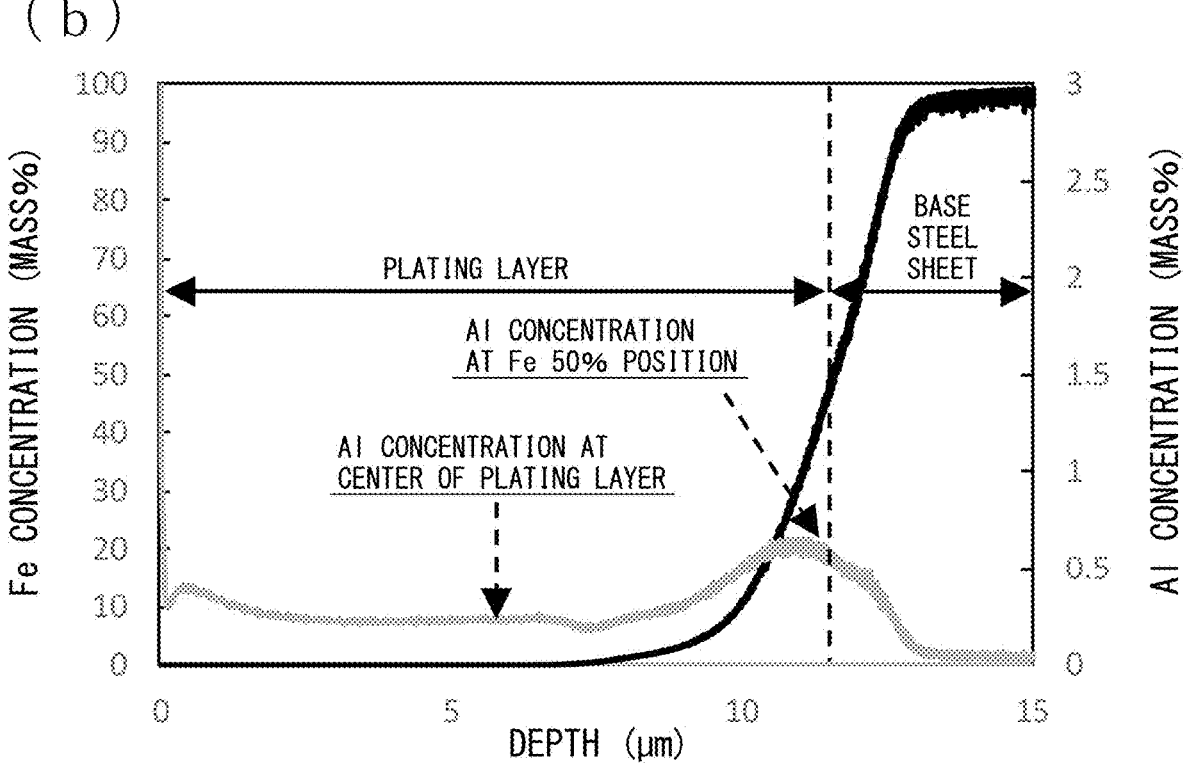

PLATED STEEL SHEET

FIELD

The present invention relates to a plated steel sheet.

BACKGROUND

The steel sheet used in automobiles, etc., requires excellent weldability. In the assembly of auto bodies and attachment of parts and other processes, spot welding is mainly utilized, but in particular in spot welding of galvanized steel sheets with each other or spot welding of galvanized steel sheet and nonplated steel sheet, it is necessary to suppress liquid metal embrittlement (LME) cracking. This phenomenon is the cracking occurring by the action of the tensile stress occurring due to welding at places where zinc converted to a liquid phase by the weld heat input penetrates to the inside of the steel sheet along the crystal grain boundaries to cause embrittlement. In spot welding, if such LME cracking occurs, the strength of the weld joint can no longer be secured, and therefore use of the galvanized steel sheet sometimes is obstructed.

In relation to this, PTL 1 teaches to deal with such LME cracking by improving the method of spot welding. More specifically, PTL 1 teaches that by continuing to press and hold the weld electrodes after finishing running current across the weld electrodes (extending the holding time Ht after welding) and adjusting that holding time Ht after welding as a function of the total sheet thickness "t" of the welded member, it is possible to cause the melted Zn plating to solidify before releasing the electrodes and as a result keep the melted Zn plating from entering the crystal grain boundaries of the steel sheet at locations with high weld residual stress and suppress cracking.

PTL 2 teaches to stop cracking by controlling the plating structure near a spot weld after spot welding. More specifically, PTL 2 describes a spot welded member, comprising a spot weld formed by holding a sheet stack of multiple steel sheets between a pair of electrodes and spot-welding the sheet stack, wherein at least one of the multiple steel sheets is a high-strength zinc-based plated steel sheet having a tensile strength of 780 MPa or more, the high-strength zinc-based plated steel sheet having a plating with an Al content of 0.5% or more by mass, and wherein a heat shock region of the spot weld outwardly extending from an edge of a corona bond area includes a plated layer including an FeAl alloy layer having an average thickness of 0.3 µm or more and a zinc-based plated layer having an average thickness of 2.0 µm or more on the FeAl alloy layer at an interface between a base steel sheet of the high-strength zinc-based plated steel sheet and the plating. Further, PTL 2 teaches that to suppress Zn penetration into the base steel sheet, it is important to make the Al content in the plating 0.5 mass % or more to thereby form a high melting point FeAl alloy layer at the interface of the steel sheet and the plating of the steel sheet by the input of heat at the time of welding.

CITATIONS LIST

Patent Literature

[PTL 1] Japanese Unexamined Patent Publication No. 2017-047475
[PTL 2] WO 2020/130079

SUMMARY

Technical Problem

PTLs 1 and 2 study suppression of LME cracking from the viewpoint of improving the spot welding method and controlling the plating structure near a spot weld after spot welding. However, PTLs 1 and 2 do not necessarily study this from the viewpoint of improving the plating structure at a plated steel sheet before spot welding. Therefore, in the inventions described in these patent literatures, there was still room for improvement regarding enhancing the LME resistance.

Therefore, the present invention has as its object to provide a plated steel sheet having improved LME resistance enabling suppression or reduction of occurrence of LME cracking at the time of spot welding by a novel constitution.

Solution to Problem

The inventors engaged in studies to suppress or reduce the occurrence of LME cracking focusing on in particular the structure of the plating layer at a plated steel sheet. As a result, the inventors discovered that by controlling the Al concentration at the center of a plating layer in a plating layer containing a relatively small amount of Al to within a predetermined range with respect to the Al concentration near the interface of the base steel sheet and plating layer, it is possible to remarkably improve the LME resistance of the plated steel sheet and thereby completed the present invention.

The present invention able to achieve the above object is as follows:

(1) A plated steel sheet comprising a base steel sheet and a plating layer formed on a surface of the base steel sheet, wherein the plating layer has a chemical composition comprising, by mass %, Al: 0.10 to 1.50% and
Fe: 0.01 to 2.00%,
further comprising at least one of:
Mg: 0 to 1.500%,
Si: 0 to 1.000%,
Ni: 0 to 1.000%,
Ca: 0 to 4.000%,
Sb: 0 to 0.500%,
Pb: 0 to 0.500%,
Cu: 0 to 1.000%,
Sn: 0 to 1.000%,
Ti: 0 to 1.000%,
Cr: 0 to 1.000%,
Nb: 0 to 1.000%,
Zr: 0 to 1.000%,
Mn: 0 to 1.000%,
Mo: 0 to 1.000%,
Ag: 0 to 1.000%,
Li: 0 to 1.000%,
La: 0 to 0.500%,
Ce: 0 to 0.500%,
B: 0 to 0.500%,
Y: 0 to 0.500%,
P: 0 to 0.500%, and
Sr: 0 to 0.500% in a total of 5.000% or less, and
a balance of Zn and impurities, and
when measuring the plating layer by glow discharge spectroscopy (GDS), a ratio of "Al concentration at center of plating layer"/"Al concentration at position of plating layer where Fe concentration is 50% of base steel sheet" is 0.10 to 1.50.

(2) The plated steel sheet according to the above (1), wherein the chemical composition comprises, by mass %, Al: 0.30 to 1.50% and, when measuring the plating layer by GDS, the ratio of the "Al concentration at center of plating layer"/"Al concentration at position of plating layer where Fe concentration is 50% of base steel sheet" is 0.20 to 1.50.

(3) The plated steel sheet according to the above (1), wherein the chemical composition comprises, by mass %, Al: 0.30 to 1.50% and, when measuring the plating layer by GDS, the ratio of the "Al concentration at center of plating layer"/"Al concentration at position of plating layer where Fe concentration is 50% of base steel sheet" is 0.30 to 1.50.

(4) The plated steel sheet according to any one of the above (1) to (3), wherein the plating layer is a hot dip galvanized (GI) layer.

(5) The plated steel sheet according to any one of the above (1) to (4), wherein the plated steel sheet has a tensile strength of 780 Mpa or more.

Advantageous Effects of Invention

According to the present invention, it is possible to provide a plated steel sheet having improved LME resistance enabling suppression or reduction of occurrence of LME cracking at the time of spot welding.

BRIEF DESCRIPTION OF DRAWINGS

FIG. 1 is a view showing the results of analysis of a plated steel sheet by GDS, wherein (a) shows the results of analysis by GDS of an Al-containing plated steel sheet produced by a usual method and (b) shows the results of analysis by GDS of a plated steel sheet according to an embodiment of the present invention.

DESCRIPTION OF EMBODIMENTS

<Plated Steel Sheet>

The plated steel sheet according to an embodiment of the present invention comprises a base steel sheet and a plating layer formed on a surface of the base steel sheet, wherein the plating layer has a chemical composition comprising, by mass %, Al: 0.10 to 1.50% and
Fe: 0.01 to 2.00%,
further comprising at least one of:
Mg: 0 to 1.500%,
Si: 0 to 1.000%,
Ni: 0 to 1.000%,
Ca: 0 to 4.000%,
Sb: 0 to 0.500%,
Pb: 0 to 0.500%,
Cu: 0 to 1.000%,
Sn: 0 to 1.000%,
Ti: 0 to 1.000%,
Cr: 0 to 1.000%,
Nb: 0 to 1.000%,
Zr: 0 to 1.000%,
Mn: 0 to 1.000%,
Mo: 0 to 1.000%,
Ag: 0 to 1.000%,
Li: 0 to 1.000%,
La: 0 to 0.500%,
Ce: 0 to 0.500%,
B: 0 to 0.500%, Y: 0 to 0.500%,
P: 0 to 0.500%, and
Sr: 0 to 0.500% in a total of 5.000% or less, and
a balance of Zn and impurities, and when measuring the plating layer by glow discharge spectroscopy (GDS), a ratio of "Al concentration at center of plating layer"/"Al concentration at position of plating layer where Fe concentration is 50% of base steel sheet" is 0.10 to 1.50.

As explained above, in spot welding galvanized steel sheets together or spot welding galvanized steel sheet and nonplated steel sheet, it is necessary to suppress LME cracking. For example, when spot welding two or more steel sheets including at least one galvanized steel sheet stacked together to prepare a joint, LME cracking sometimes occurs inside of the pressure weld formed at the outside of the weld metal (nugget) or its immediate outside or at the surfaces at the electrode sides. LME cracking occurs by the action of the tensile stress occurring due to welding, for example, the tensile stress caused by the squeezing force by the electrodes, expansion and contraction of the welds, springback at the time of release of the electrodes, and numerous other factors, at places where the zinc converted to a liquid phase by weld heat input at the time of spot welding penetrates to the inside of the steel sheet along the crystal grain boundaries to cause embrittlement. Therefore, the inventors focused on the structure of the plating layer at a plated steel sheet so as to suppress or reduce such penetration of Zn to the inside of the steel sheet and engaged in studies to make the structure of the plating layer more suitable.

First, the inventors discovered that in a plating layer mainly comprised of zinc (Zn), adding a relatively small amount, i.e., a 0.10 to 1.50 mass % amount, of Al is effective from the viewpoint of suppressing or reducing the penetration of Zn to the inside of the steel sheet. If the amount of addition of Al becomes greater, the structure of the plating layer will approach a Zn—Al eutectic composition, and therefore the melting point of the plating layer will fall. For this reason, there is a strong possibility that excessive addition of Al would act disadvantageously from the viewpoint of suppressing or reducing the penetration of molten Zn to the inside of the steel sheet to improve the LME resistance. In particular, if adding Al in an amount greatly exceeding 1.50 mass %, the minus effect due to the excessive addition of Al will become remarkable and it is believed the effect of suppression of LME cracking due to Al addition would no longer be possible to be sufficiently manifested. In addition, the inventors discovered that by controlling the Al concentration distribution in a plating layer so that the ratio of the Al concentration at the center of the plating layer with respect to the Al concentration near the interface of the base steel sheet and plating layer, more specifically with respect to the Al concentration at the position of the plating layer where the Fe concentration is 50% of the base steel sheet, is 0.10 to 1.50, it is possible to remarkably improve the LME resistance of a plated steel sheet. Below, this will be explained in more detail with reference to the drawings.

FIG. 1 is a view showing the results of analysis of a plated steel sheet by GDS, wherein FIG. 1(a) shows the results of analysis by GDS of an Al-containing plated steel sheet produced by a usual method and FIG. 1(b) shows the results of analysis by GDS of a plated steel sheet according to an embodiment of the present invention. First, referring to FIG. 1(a), it will be understood that in an Al-containing plated steel sheet made by a usual method where a plating layer mainly comprised of Zn is made to contain Al in 0.20%, the Al concentration gradually rises the deeper the depth from the depth position 0 μm, corresponding to the plating surface, and the Al concentration has a relatively high peak near the interface of the base steel sheet and the plating layer, i.e., near the position of the plating layer where the Fe concentration is 50% of the base steel sheet. The peak of this Al concentration suggests that an Fe—Al barrier layer including an alloy of Fe and Al is formed at the interface of the base steel sheet and the plating layer. As clear from the fact that the peak of the Al concentration is relatively high, in an Al-containing plated steel sheet produced by a usual method, a large amount of Al in the plating layer is consumed for formation of the Fe—Al barrier layer whereby a relatively thick Fe—Al barrier layer is formed. For this reason, in FIG. 1(a), the Al concentration greatly decreased the more to the plating surface side from near the interface of the base steel sheet and the plating layer and then became a substantially constant low value. It will be understood that the Al concentration exhibits a low value of about 0.1% or so at the center of the plating layer, corresponding to the intermediate position between the position of the plating layer where the Fe concentration is 50% of the base steel sheet and the plating surface.

In contrast to this, referring to FIG. 1(b), it will be understood that in a plated steel sheet according to an embodiment of the present invention provided with a plating layer having a similar Al content, the Al concentration near the interface of the base steel sheet and the plating layer is much lower compared with the case of FIG. 1(a). Therefore, in a plated steel sheet according to an embodiment of the present invention, an Fe—Al barrier layer thinner than the case of FIG. 1(a) is formed. In relation to this, in FIG. 1(b), it will be understood that even the more to the plating surface side from near the interface of the base steel sheet and the plating layer, the Al concentration in the plating layer does not greatly decrease, but decreases relatively gently, then becomes a substantially constant value and that at the center of the plating layer, the Al concentration exceeds about 0.2% and exhibits an extremely high value of about 2 times or more compared with the case of FIG. 1(a). From the results of analysis by GDS of FIGS. 1(a) and (b), it is believed that in the plated steel sheet according to an embodiment of the present invention, a large amount of Al in the plating layer is not consumed for formation of the Fe—Al barrier layer but remains as an Al phase in for example a dissolved state in the plating layer other than at the Fe—Al barrier layer. The inventors conducted further studies thinking that from the results of analysis by GDS of the plated steel sheets and the fact that the plated steel sheet of FIG. 1(b) exhibited a higher LME resistance compared with the plated steel sheet of FIG. 1(a) in experiments, an Al phase present in the plating layer other than the Fe—Al barrier layer plays an extremely important role in suppressing or reducing the penetration of molten Zn to the inside of a steel sheet. As a result, the inventors discovered that by controlling the amount of addition of Al as a whole to the relatively low amount of 1.50 mass % or less so as to suppress deterioration of the LME resistance due to the lowering of the melting point of the plating layer while controlling the ratio of the "Al concentration at center of plating layer"/"Al concentration at position of plating layer where Fe concentration is 50% of base steel sheet" when measuring the plating layer by GDS within a range of 0.10 to 1.50, it is possible to sufficiently manifest the effect due to addition of Al to the plating layer to suppress or reduce penetration of molten Zn to the inside of the steel sheet and, in relation to this, remarkably improve the LME resistance of a plated steel sheet.

While not intending to be bound to any specific theory, in the plated steel sheet according to an embodiment of the present invention, it is believed that the Al in the plating layer acts in the following way to suppress or reduce Zn converted to a liquid phase by the weld heat input at the time of spot welding from penetrating to the inside of the steel sheet along the crystal grain boundaries. If explained in more detail, first, in a plated steel sheet, it is believed that the Fe—Al barrier layer formed at the interface of the base steel sheet and the plating layer is relatively brittle, and therefore relatively easily fractures due to the stress applied to the steel sheet due to the squeezing force by electrodes, etc., at the time of spot welding. Zn melting at the time of spot welding directly contacts the base steel sheet due to such fracture of the Fe—Al barrier layer, and therefore the risk of the molten Zn penetrating to the inside of the steel sheet along the crystal grain boundaries rises. However, according to the plated steel sheet according to an embodiment of the present invention, the Al present in a relatively large amount at parts of the plating layer other than the Fe—Al barrier layer directly contacts the base steel sheet along with Zn due to fracture of the Fe—Al barrier layer. In this case, it is believed that, due to the heat input at the time of spot welding, the Al in the plating layer reacts with the Fe in the base steel sheet to newly form an Fe—Al barrier layer and as a result the fractured Fe—Al barrier layer is repaired. That is, due to Al being present in a large amount in the plating layer other than at the Fe—Al barrier layer, at the time of spot welding, even if the Zn directly contacts the base steel sheet due to fracture of the Fe—Al barrier layer, etc., a new Fe—Al barrier layer is immediately formed at the fracture due to the Al present immediately close by. For this reason, according to the plated steel sheet according to an embodiment of the present invention, it is possible to remarkably suppress or reduce the penetration of molten Zn to the inside of the steel sheet at the time of spot welding, and therefore it is believed it is possible to reliably suppress or reduce occurrence of LMC cracking at the plated steel sheet. In the past, the plated steel sheet in which Al was added to the Zn-based plating layer has been known, but the fact that by keeping the amount of Al of the plating layer as a whole relatively low in consideration of the drop in the melting point of the plating layer while on the other hand making the amount of Al in the plating layer other than at the Fe—Al barrier layer increase, it is possible to suppress or reduce the penetration of molten Zn to the inside of the steel sheet at the time of spot welding has not been conventionally known and was first made clear this time by the inventors.

Below, the plated steel sheet according to an embodiment of the present invention will be explained in more detail. In the following explanation, the "%" of the units of content of the elements, unless otherwise indicated, means "mass %". Further, in this Description, "to" showing a numerical range, unless otherwise indicated, is used in the sense including the numerical values described before and after it as the lower limit value and upper limit value.

[Plating Layer]

According to an embodiment of the present invention, a plating layer is formed on a surface of a base steel sheet. For example, it is formed on at least one surface, preferably both surfaces, of the base steel sheet. The plating layer has the following chemical composition.

[Al: 0.10 to 1.50%]

Al is an element effective for suppressing molten Zn from penetrating to the inside of steel sheet along the crystal grain boundaries. To sufficiently obtain such an effect, the Al content is 0.10% or more. The Al content may also be 0.12% or more, 0.15% or more, 0.18% or more, 0.20% or more, 0.25% or more, 0.30% or more, 0.35% or more, 0.40% or more, more than 0.60%, 0.62% or more, 0.65% or more, or 0.70% or more. On the other hand, if excessively including Al, the composition of the plating layer becomes close to that of a Zn—Al eutectic composition, and therefore the melting point of the plating layer falls. For this reason, the Zn in the plating layer easily melts at the time of spot welding and LME cracking sometimes is promoted. Therefore, the Al content is 1.50% or less. The Al content may also be 1.45% or less, 1.40% or less, 1.30% or less, 1.20% or less, 1.10% or less, 1.00% or less, 0.90% or less, or 0.80% or less.

[Fe: 0.01 to 2.00%]

Fe is, for example, an element which dissolves out from the base steel sheet into the plating bath or which, at the time of plating treatment, reacts with the Al to form an Fe—Al barrier layer at the interface of the base steel sheet and the plating layer and thus is unavoidably contained in the plating layer. For this reason, in the plated steel sheet according to an embodiment of the present invention, the Fe content in the plating layer becomes 0.01% or more. The Fe content may also be 0.05% or more, 0.10% or more, 0.15% or more, 0.20% or more, 0.25% or more, 0.30% or more, 0.40% or more or 0.50% or more. On the other hand, if the Fe content in the plating layer is too high, the Al in the plating layer bonds with the Fe or much of the Al is consumed for forming an Fe—Al barrier layer. As a result, sometimes the effect of suppression of LME cracking due to the addition of Al can no longer be sufficiently exhibited. Therefore, the Fe content is 2.00% or less. The Fe content may also be 1.80% or less, 1.60% or less, 1.50% or less, 1.30% or less, 1.20% or less, 1.00% or less, 0.90% or less, 0.80% or less, 0.70% or less, or 0.60% or less.

The basic chemical composition of the plating layer is as explained above. Furthermore, the plating layer may optionally contain at least one of Mg: 0 to 1.500%, Si: 0 to 1.000%, Ni: 0 to 1.000%, Ca: 0 to 4.000%, Sb: 0 to 0.500%, Pb: 0 to 0.500%, Cu: 0 to 1.000%, Sn: 0 to 1.000%, Ti: 0 to 1.000%, Cr: 0 to 1.000%, Nb: 0 to 1.000%, Zr: 0 to 1.000%, Mn: 0 to 1.000%, Mo: 0 to 1.000%, Ag: 0 to 1.000%, Li: 0 to 1.000%, La: 0 to 0.500%, Ce: 0 to 0.500%, B: 0 to 0.500%, Y: 0 to 0.500%, P: 0 to 0.500%, and Sr: 0 to 0.500%. These optional elements are included in a total of 5.000% or less from the viewpoint of sufficiently obtaining the actions and functions of the basic constituents forming the plating layer, in particular the Al. The optional elements may be included in a total of 4.500% or less, 4.000% or less, 3.500% or less, 3.000% or less, 2.500% or less, 2.000% or less, 1.500% or less, or 1.000% or less. Below, these optional elements will be explained in detail.

[Mg: 0 to 1.500%]

Mg is an element effective for improving the corrosion resistance of the plating layer. The Mg content may be 0%, but to obtain such an effect, the Mg content is preferably 0.001% or more. The Mg content may also be 0.010% or more, 0.050% or more, or 0.100% or more. On the other hand, if excessively containing Mg, sometimes a large number of the brittle compound MgZn-based compounds is formed in the plating layer. These can become causes for a drop in workability. Therefore, the Mg content is preferably 1.500% or less. The Mg content may also be 1.200% or less, 1.000% or less, 0.800% or less, 0.500% or less, 0.240% or less, 0.220% or less, or 0.200% or less.

[Si: 0 to 1.000%]

Si is an element effective for improving the corrosion resistance of the plating layer. The Si content may be 0%, but Si may also be contained in the plating layer in an amount of 0.0001% or more or 0.0010% or more, if necessary. On the other hand, if excessively containing Si, sometimes the plating adhesion of the plating layer will fall. Therefore, the Si content is preferably 1.000% or less. The Si content may also be 0.800% or less, 0.500% or less, 0.100% or less, or 0.050% or less.

[Ni: 0 to 1.000%]

Ni is an element effective for improving the corrosion resistance of the plating layer. The Ni content may be 0%, but to obtain such an effect, the Ni content is preferably 0.0010% or more. The Ni content may also be 0.005% or more, 0.010% or more, or 0.020% or more. On the other hand, if excessively containing Ni, sometimes a large amount of intermetallic compounds will be formed and the corrosion resistance will fall. Therefore, the Ni content is preferably 1.000% or less. The Ni content may also be 0.800% or less, 0.600% or less, or 0.400% or less.

[Ca: 0 to 4.000%]

Ca is an element effective for securing the wettability of the plating bath. The Ca content may be 0%, but to obtain such an effect, the Ca content is preferably 0.001% or more. The Ca content may also be 0.010% or more, 0.100% or more, or 1.000% or more. On the other hand, if excessively containing Ca, sometimes a large amount of hard intermetallic compounds will be formed in the plating layer, plating layer will become brittle, and adhesion with the steel sheet will fall. Therefore, the Ca content is preferably 4.000% or less. The Ca content may also be 3.000% or less, 2.000% or less, or 1.500% or less.

[Sb: 0 to 0.500%, Pb: 0 to 0.500%, Cu: 0 to 1.000%, Sn: 0 to 1.000%, Ti: 0 to 1.000%, Cr: 0 to 1.000%, Nb: 0 to 1.000%, Zr: 0 to 1.000%, Mn: 0 to 1.000%, Mo: 0 to 1.000%, Ag: 0 to 1.000%, Li: 0 to 1.000%, La: 0 to 0.500%, Ce: 0 to 0.500%, B: 0 to 0.500%, Y: 0 to 0.500%, P: 0 to 0.500%, and Sr: 0 to 0.500%]

Sb, Pb, Cu, Sn, Ti, Cr, Nb, Zr, Mn, Mo, Ag, Li, La, Ce, B, Y, P, and Sr need not be included in the plating layer, but can be present in the plating layer in amounts of 0.0001% or more or 0.001% or more. These elements do not detrimentally affect the performance as a plated steel sheet if within the predetermined ranges of content. However, if the contents of the elements are excessive, sometimes the corrosion resistance will fall. Therefore, the contents of Sb, Pb, La, Ce, B, Y, P, and Sr are preferably 0.500% or less. For example, they may also be 0.300% or less, 0.100% or less, or 0.050% or less. Similarly, the contents of Cu, Sn, Ti, Cr, Nb, Zr, Mn, Mo, Ag, and Li are preferably 1.000% or less, for example, may be 0.800% or less, 0.500% or less, or 0.100% or less.

In the plating layer, the balance besides the above elements is comprised of Zn and impurities. The "impurities" in the plating layer are constituents, etc., entering during to various factors in the production process, such as raw materials, when producing the plating layer.

The chemical composition of the plating layer can be determined by dissolving the plating layer in an acid solution to which an inhibitor suppressing corrosion of the base steel sheet is added and measuring the obtained solution by ICP (high frequency inductively coupled plasma) spectroscopy.

The plating layer may be any plating layer having the above chemical composition. It is not particularly limited, but for example is preferably a hot dip galvanized (GI) layer. For example, if performing heat treatment for alloying, the Fe content in the plating layer becomes higher and, in the final plating layer, sometimes the desired chemical composition and ratio of the "Al concentration at center of plating layer"/"Al concentration at position of plating layer where Fe concentration is 50% of base steel sheet" cannot be obtained. Further, the thickness of the plating layer may, for example, be 3 to 50 μm. The amount of deposition of the plating layer is not particularly limited, but for example may be 10 to 170 g/m$^2$ per surface. The amount of deposition of the plating layer may also be 45 g/m$^2$ or more or 50 g/m$^2$ or more per surface. Similarly, the amount of deposition of the plating layer may be 75 g/m$^2$ or less or 70 g/m$^2$ or less per surface. The amount of deposition of the plating layer is determined by dissolving the plating layer in an acid solution containing an inhibitor for suppressing corrosion of the base steel sheet and finding the change in weight from before to after the pickling.

[Ratio of "Al Concentration at Center of Plating Layer"/"Al Concentration at Position of Plating Layer where Fe Concentration is 50% of Base Steel Sheet": 0.10 to 1.50]

In an embodiment of the present invention, when measuring the plating layer by glow discharge spectroscopy (GDS), the ratio of the "Al concentration at center of plating layer"/"Al concentration at position of plating layer where Fe concentration is 50% of base steel sheet" is 0.10 to 1.50. By controlling the ratio of the "Al concentration at center of plating layer"/"Al concentration at position of plating layer where Fe concentration is 50% of base steel sheet" when measuring the plating layer by GDS to within such a range, it is possible to sufficiently manifest the effect due to addition of Al to the plating layer and suppress or reduce penetration of molten Zn to the inside of the steel sheet and as a result remarkably improve the LME resistance of the plated steel sheet. From the viewpoint of improving the LME resistance, the higher the ratio of the "Al concentration at center of plating layer"/"Al concentration at position of plating layer where Fe concentration is 50% of base steel sheet" the better. Preferably, it is 0.15 or more, more preferably 0.20 or more, most preferably 0.30 or more. For example, it may also be 0.40 or more, 0.42 or more, 0.45 or more, 0.50 or more, 0.55 or more, or 0.60 or more. This ratio can be increased by increasing the Al content of the plating layer as a whole while applying the method of production of plated steel sheet explained in detail later. For example, to make this ratio 0.20 or more or 0.30 or more, the Al content of the plating layer as a whole is preferably 0.30% or more. On the other hand, if the ratio of the "Al concentration at center of plating layer"/"Al concentration at position of plating layer where Fe concentration is 50% of base steel sheet" becomes too high, sometimes the melting point of the plating layer will fall along with the increase in the Al content of the plating layer as a whole related to the same. For this reason, at the time of spot welding, the Zn in the plating layer easily melts and LME cracking is liable to be promoted. Therefore, in an embodiment of the present invention, the ratio of the "Al concentration at center of plating layer"/"Al concentration at position of plating layer where Fe concentration is 50% of base steel sheet" is 1.50 or less. For example, it may also be 1.40 or less, 1.30 or less, 1.20 or less, 1.10 or less, or 1.00 or less.

[Method of Measurement of Ratio of "Al Concentration at Center of Plating Layer"/"Al Concentration at Position of Plating Layer where Fe Concentration is 50% of Base Steel Sheet"]

The ratio of the "Al concentration at center of plating layer"/"Al concentration at position of plating layer where Fe concentration is 50% of base steel sheet" is determined in the following way. First, a plated steel sheet sample cut from a plated steel sheet to a 50 mm×50 mm size is obtained, then that plated steel sheet sample is measured by glow discharge spectroscopy (GDS) to obtain the Al concentration distribution from the surface of the plating layer to 100 μm in the depth direction. Next, the Al concentration at the depth position where the Fe intensity becomes 50% of the Fe intensity of the base steel sheet in GDS measurement (Fe intensity at depth 100 μm position from surface of plating layer of sample) is determined as the "Al concentration at position of plating layer where Fe concentration is 50% of base steel sheet". The distance from this depth position to the surface is defined as the thickness of the plating layer. The Al concentration by GDS at the ½ position of thickness of the plating layer is determined as the "Al concentration at center of plating layer" and, finally, the ratio of the "Al concentration at center of plating layer"/"Al concentration at position of plating layer where Fe concentration is 50% of base steel sheet" is determined.

[Base Steel Sheet]

In an embodiment of the present invention, the base steel sheet for forming the above plating layer is not particularly limited and may be any suitable material. For example, the base steel sheet may be a material having a chemical composition giving a tensile strength of the plated steel sheet of 780 MPa or more. In general, it is known that LME cracking remarkably occurs when spot welding a steel sheet having a relatively high strength and that the higher strength the steel sheet is made, the higher the sensitivity to LME cracking tends to become. Therefore, if the plated steel sheet according to an embodiment of the present invention has a high tensile strength of 780 MPa or more, the effect of suppression of LME cracking becomes particularly remarkable compared with a conventional plated steel sheet having the same tensile strength.

[Preferable Chemical Composition of Base Steel Sheet]

The present invention, as explained above, has as its object to provide a plated steel sheet having improved LME resistance enabling the suppression or reduction of occurrence of LME cracking at the time of spot welding and achieves this object by forming on the surface of the base steel sheet a plating layer having a predetermined chemical composition and having a ratio of the "Al concentration at center of plating layer"/"Al concentration at position of plating layer where Fe concentration is 50% of base steel sheet" of 0.10 to 1.50 when measured by GDS. Therefore, it is clear that the chemical composition itself of the base steel sheet is not a technical feature essential in achieving the object of the present invention. Below, the preferable chemical composition of the base steel sheet used in the plated steel sheet according to an embodiment of the present invention will be explained in detail, but the explanations are intended to simply illustrate the preferred chemical composition of a base steel sheet for a plated steel sheet having a tensile strength of 780 MPa or more in which LME remarkably occurs when spot welding, i.e., a plated steel sheet where the effect of suppression of LME cracking according to the present invention is particularly remarkable. Therefore, the explanations are not intended to limit the present invention to one using a base steel sheet having such a specific chemical composition.

In an embodiment of the present invention, for example, the base steel sheet preferably has a chemical composition comprising, by mass %, C: 0.01 to 0.50%,
Si: 0.01 to 3.50%,
Mn: 0.10 to 5.00%,
P: 0.100% or less,
S: 0.0300% or less,
N: 0.0100% or less,
O: 0 to 0.020%, Al: 0 to 1.000%,
B: 0 to 0.010%,
Nb: 0 to 0.150%,
Ti: 0 to 0.20%,
Mo: 0 to 3.00%,
Cr: 0 to 2.00%,
V: 0 to 1.00%,
Ni: 0 to 2.00%,
W: 0 to 1.00%,
Ta: 0 to 0.10%,
Co: 0 to 3.00%,
Sn: 0 to 1.00%,
Sb: 0 to 0.50%,
Cu: 0 to 2.00%,
As: 0 to 0.050%,
Mg: 0 to 0.100%,
Ca: 0 to 0.100%,
Zr: 0 to 0.100%,
Hf: 0 to 0.100%,
REM: 0 to 0.10, and
a balance: Fe and impurities. Below, the elements will be explained in more detail.

[C: 0.01 to 0.50%]

C is an element increasing the tensile strength inexpensively and an element important for controlling the strength of steel. To sufficiently obtain such an effect, the C content is preferably 0.01% or more. The C content may also be 0.05% or more, 0.08% or more, 0.09% or more, 0.10% or more, or 0.15% or more. On the other hand, if excessively containing C, sometimes a drop in elongation is invited. For this reason, the C content is preferably 0.50% or less. The C content may also be 0.40% or less, 0.35% or less, or 0.30% or less.

[Si: 0.01 to 3.50%]

Si is an element acting as a deoxidizer and suppressing the precipitation of carbides in the cooling process during annealing of a cold rolled sheet. To sufficiently obtain such an effect, the Si content is preferably 0.01% or more. The Si content may also be 0.05% or more, 0.08% or more, 0.10% or more, 0.30% or more, or 0.80% or more. On the other hand, if excessively including Si, sometimes a drop in elongation is invited along with an increase in steel strength. For this reason, the Si content is preferably 3.50% or less. The Si content may also be 2.50% or less, 2.00% or less, or 1.50% or less.

[Mn: 0.10 to 5.00%]

Mn is an element affecting the ferrite transformation of steel and an element effective for raising the strength. To sufficiently obtain such an effect, the Mn content is preferably 0.10% or more. The Mn content may also be 0.50% or more, 0.60% or more, 0.80% or more, 1.00% or more, or 1.50% or more. On the other hand, if excessively including Mn, sometimes a drop in elongation is invited along with an increase in steel strength. For this reason, the Mn content is preferably 5.00% or less. The Mn content may also be 4.00% or less, 3.00% or less, or 2.50% or less.

[P: 0.100% or Less]

P is an element precipitating at the grain boundaries and promoting embrittlement of the steel. The P content is preferably as small as possible, and therefore ideally is 0%. However, excessive reduction of the P content sometimes invites a large increase in costs. For this reason, the P content may be 0.0001% or more and may be 0.001% or more or 0.005% or more. On the other hand, if excessively including P, as explained above, sometimes embrittlement of the steel is invited due to grain boundary segregation. Therefore, the P content is preferably 0.100% or less. The P content may also be 0.050% or less, 0.030% or less, or 0.010% or less.

[S: 0.0300% or Less]

S is an element forming MnS and other nonmetallic inclusions in steel and inviting a drop in ductility of the steel part. The S content is preferably as small as possible, and therefore ideally is 0%. However, excessive reduction of the S content sometimes invites a large increase in costs. For this reason, the S content may be 0.00010% or more and may be 0.0002% or more, 0.0010% or more, or 0.0050% or more. On the other hand, if excessively including S, sometimes cracks are invited starting from the nonmetallic inclusions at the time of cold forming. Therefore, the S content is preferably 0.0300% or less. The S content may also be 0.0200% or less, 0.0150% or less, or 0.0100% or less.

[N: 0.0100% or Less]

N is an element forming coarse nitrides in a steel sheet and lowering the workability of a steel sheet. The N content is preferably as small as possible, and therefore ideally is 0%. However, excessive reduction of the N content sometimes invites a large increase in costs. For this reason, the N content may be 0.0001% or more and may be 0.0005% or more or 0.0010% or more. On the other hand, if excessively including N, as explained above, sometimes coarse nitrides are formed and the workability of a steel sheet is lowered. Therefore, the N content is preferably 0.0100% or less. The N content may also be 0.0080% or less or 0.0050% or less.

The preferable basic chemical composition of the base steel sheet is as explained above. Furthermore, the base steel sheet may, if necessary, contain one or more selected from the group consisting of O: 0 to 0.020%, Al: 0 to 1.000%, B: 0 to 0.010%, Nb: 0 to 0.150%, Ti: 0 to 0.20%, Mo: 0 to 3.00%, Cr: 0 to 2.00%, V: 0 to 1.00%, Ni: 0 to 2.00%, W: 0 to 1.00%, Ta: 0 to 0.10%, Co: 0 to 3.00%, Sn: 0 to 1.00%, Sb: 0 to 0.50%, Cu: 0 to 2.00%, As: 0 to 0.050%, Mg: 0 to 0.100%, Ca: 0 to 0.100%, Zr: 0 to 0.100%, Hf: 0 to 0.100%, and REM: 0 to 0.100% in place of part of the Fe of the balance. The elements may be 0.0001% or more, 0.0005% or more, or 0.001% or more.

In the base steel sheet, the balance besides the above elements is comprised of Fe and impurities. The "impurities" in the base steel sheet are constituents, etc., entering due to various factors in the production process, first and foremost the ore, scrap, and other materials, when industrially producing the base steel sheet.

The chemical composition of the base steel sheet may be measured by a general analysis method. For example, the chemical composition of the base steel sheet may be measured by removing the plating layer by mechanical grinding, then using inductively coupled plasma-atomic emission spectroscopy (ICP-AES). C and S may be measured using the combustion-infrared absorption method, N may be measured using the inert gas melting-thermal conductivity method, and O may be measured by the inert gas melting-nondispersion type infrared absorption method.

[Sheet Thickness of Base Steel Sheet]

The sheet thickness of the base steel sheet is not particularly limited, but for example is 0.2 mm or more and may also be 0.3 mm or more, 0.6 mm or more, 1.0 mm or more, or 2.0 mm or more. Similarly, the sheet thickness of the base steel sheet is, for example, 6.0 mm or less and may also be 5.0 mm or less, 4.0 mm or less, 3.0 mm or less, or 2.5 mm or less.

[Mechanical Properties of Plated Steel Sheet]

The plated steel sheet according to an embodiment of the present invention can have any suitable tensile strength and is not particularly limited, but for example preferably has a tensile strength of 780 MPa or more. As explained above, LME cracking remarkably occurs when spot welding steel sheet having a relatively high strength. For this reason, if the plated steel sheet according to an embodiment of the present invention has a 780 MPa or more high tensile strength, the effect of suppression of LME cracking becomes particularly remarkable compared with the case of conventional plated steel sheet having the same tensile strength. For example, in an embodiment of the present invention, the tensile strength of the plated steel sheet may be 980 MPa or more, 1080 MPa or more, or 1180 MPa or more. The upper limit is not particularly prescribed, but, for example, the tensile strength of the plated steel sheet may be 2300 MPa or less, 2000 MPa or less, 1800 MPa or less, or 1500 MPa or less. The tensile strength is measured by taking a JIS No. 5 test piece from an orientation at which a long direction of the test piece becomes parallel to the perpendicular direction to rolling of the plated steel sheet and conducting a tensile test based on JIS Z 2241: 2011.

<Method of Production of Plated Steel Sheet>

Next, a preferred method of production of the plated steel sheet according to an embodiment of the present invention will be explained. The following explanation is intended to illustrate the characteristic method for producing the plated steel sheet according to an embodiment of the present invention and is not intended to limit the plated steel sheet to one produced by the method of production such as explained below.

The plated steel sheet according to the present invention can, for example, be produced by performing a casting step of casting molten steel adjusted in chemical composition so as to form a steel slab, a hot rolling step of hot rolling the steel slab to obtain a hot rolled steel sheet, a coiling step of coiling the hot rolled steel sheet, a cold rolling step of cold rolling the coiled hot rolled steel sheet to obtain a cold rolled steel sheet, a pretreatment step, an annealing step of annealing the pretreated cold rolled steel sheet, and a plating step of forming a plating layer on the obtained base steel sheet. Alternatively, it is also possible to not coil the steel sheet after the hot rolling step, but perform the cold rolling step as is after pickling. Below, the steps will be explained in detail.

[Casting Step]

The conditions of the casting step are not particularly limited. For example, the casting may be performed by smelting using a blast furnace, electric furnace, etc., followed by performing various secondary refining, then casting using the usual continuous casting, casting using the ingot method, or other method.

[Hot Rolling Step]

The cast steel slab can be hot rolled to obtain a hot rolled steel sheet. The hot rolling step is performed by hot rolling the cast steel slab directly or by cooling once, then reheating it. If reheating, the heating temperature of the steel slab may be, for example, 1100 to 1250° C. In the hot rolling step, usually rough rolling and finish rolling are performed. The temperatures and rolling reductions of the rolling operations may be suitably determined in accordance with the desired metallographic structures and sheet thicknesses. For example, the end temperature of the finish rolling may be 900 to 1050° C. and the rolling reduction of the finish rolling may be 10 to 50%.

[Coiling Step]

The hot rolled steel sheet can be coiled at a predetermined temperature. The coiling temperature can be suitably determined in accordance with the desired metallographic structure, etc. For example, it may be 500 to 800° C. It is also possible impart predetermined heat treatment to the hot rolled steel sheet before coiling or after coiling, then uncoiling. Alternatively, the coiling step need not be performed and the steel sheet may be pickled after the hot rolling step, then subjected to the later explained cold rolling step.

[Cold Rolling Step]

The hot rolled steel sheet can be pickled, etc., then cold rolled to obtain the cold rolled steel sheet. The rolling reduction of the cold rolling can be suitably determined in accordance with the desired metallographic structure or sheet thickness. For example, it may be 20 to 80%. After the cold rolling step, for example, it may be air cooled to cool it down to room temperature.

[Pretreatment Step]

Next, it is effective to subject the cold rolled steel sheet to a predetermined pretreatment step before annealing. As such a pretreatment step, degreasing treatment and an optional grinding treatment can be included. The degreasing treatment, for example, may include running a current through the cold rolled steel sheet in a pH8.0 or more solution (electrolysis treatment). The current density at the time of running the current may be 1.0 to 8.0 A/dm². The current running time may be 5 to 10 seconds. On the other hand, the optional grinding treatment is preferably performed using a heavy duty grinding brush. By grinding using a heavy duty grinding brush to introduce strain to the surface of the cold rolled steel sheet, formation of nuclei of the Fe—Al barrier layer is promoted at the time of the plating step after the annealing step and the Fe—Al barrier layer can be made denser. In turn, the growth rate of the Fe—Al barrier layer becomes slower, and therefore the thickness can be reduced. As a result, it is possible to reduce the amount of Al consumed for forming the Fe—Al barrier layer. Therefore, it is possible to increase the amount of Al in the plating layer other than at the Fe—Al barrier layer, and therefore in the finally obtained plated steel sheet, it is possible to raise the ratio of the "Al concentration at center of plating layer"/"Al concentration at position of plating layer where Fe concentration is 50% of base steel sheet" and possible to achieve a higher LME resistance. The grinding treatment is not particularly limited, but, for example, it can be performed by using a heavy duty grinding brush to grind down the surface of the cold rolled steel sheet under conditions of a grinding amount of 10 to 200 g/m². The amount of grinding by the heavy duty grinding brush can be adjusted by any suitable method known to persons skilled in the art. It is not particularly limited, but, for example, can be adjusted by suitably selecting the number of heavy duty grinding brushes, the speeds, the brush screw-in amount, the coating solution used, etc.

[Annealing Step]

The pretreated cold rolled steel sheet is annealed. The holding temperature in the annealing step is preferably 700 to 900° C. If the holding temperature in the annealing step is more than 900° C., the steel sheet surface is formed with an external oxide layer and plateability is liable to decline. The rate of temperature rise up to the above holding temperature is not particularly limited, but may be 1 to 10° C./s. The holding time at the above holding temperature is preferably 10 to 300 seconds, more preferably 80 to 120 seconds. If the holding time is more than 300 seconds, external oxides excessively grow and the plateability is liable to fall. The dew point of the atmosphere in the annealing step is preferably −20 to 10° C., more preferably −10 to 5° C. If the dew point is too low, the surface of the steel sheet will be formed with an external oxide layer and the plateability will sometimes fall. On the other hand, if the dew point is too high as well, similarly the steel sheet surface will be formed with Fe oxides as external oxides and sometimes the plateability will fall. Further, the atmosphere at the annealing step may be a reducing atmosphere, more specifically a reducing atmosphere containing nitrogen and hydrogen, for example a hydrogen 1 to 10% reducing atmosphere (for example, hydrogen 4% and nitrogen balance).

[Plating Step]

Next, in the plating step, at least one surface, preferably both surfaces, of the cold rolled steel sheet (base steel sheet) is formed with a plating layer having the chemical composition and structure explained above. More specifically, the plating step is, for example, performed by hot dip plating using a plating bath adjusted in constituents so that the chemical composition of the plating layer becomes within the range explained above. In the plating step, it is extremely important to first control the time from dipping the steel sheet in the plating bath to the start of cooling to 6 seconds or less, then control the average cooling speed from the bath temperature (for example, 420 to 480° C.) down to 370° C. to 20° C./s or more. By satisfying these requirements, it is possible to make the Fe—Al barrier layer thinner and reduce the amount of Al consumed for formation of the Fe—Al barrier layer and possible to reliably secure the amount of Al present in the plating layer other than at the Fe—Al barrier layer. As a result, in the finally obtained plated steel sheet, it is possible to make the ratio of the "Al concentration at center of plating layer"/"Al concentration at position of plating layer where Fe concentration is 50% of base steel sheet" 0.10 or more and possible to reliably improve the LME resistance of the plated steel sheet. On the other hand, if any of these requirements is not satisfied, i.e., if the time from starting to dip the steel sheet in the plating bath to starting cooling exceeds 6 seconds and/or the average cooling speed from the bath temperature down to 370° C. is less than 20° C./s, a large amount of Al is consumed for forming the Fe—Al barrier layer and the amount of Al present in the plating layer other than at the Fe—Al barrier layer decreases. As a result, in the finally obtained plated steel sheet, the desired ratio of the "Al concentration at center of plating layer"/"Al concentration at position of plating layer where Fe concentration is 50% of base steel sheet" can no longer be obtained and the LME resistance of the plated steel sheet falls.

From the viewpoint of better improving the LME resistance of the plated steel sheet, the time from dipping the steel sheet in the plating bath to the start of cooling is preferably shorter and the average cooling speed from the bath temperature down to 370° C. is preferably faster. For example, by making the Al content of the plating layer as a whole 0.30% or more and by making the time from dipping the steel sheet in the plating bath to the start of cooling 4 seconds or less and the average cooling speed from the bath temperature down to 370° C. 40° C./s or more, it is possible to better improve the LME resistance of the plated steel sheet. If performing grinding treatment by a heavy duty grinding brush as the previously explained pretreatment step, even under conditions of the time from dipping the steel sheet in the plating bath to the start of cooling of 6 seconds or less and the average cooling speed from the bath temperature down to 370° C. of 20° C./s or more, a similar higher LME resistance can be achieved by combination with the condition of the Al content of the plating layer as a whole being 0.30% or more. Alternatively, further, by making the Al content of the plating layer as a whole 0.30% or more, performing grinding treatment by a heavy duty grinding brush as the previously explained pretreatment step, and further making the time from dipping the steel sheet in the plating bath to the start of cooling 4 seconds or less and making the average cooling speed from the bath temperature down to 370° C. 40° C./s or more, it is possible to more remarkably improve the LME resistance of the plated steel sheet. The lower limit of the time from dipping the steel sheet in the plating bath to the start of cooling is not particularly prescribed, but for example the time from dipping the steel sheet in the plating bath to the start of cooling may be 2 seconds or more. Similarly, the upper limit of the average cooling speed from the bath temperature down to 370° C. is not particularly prescribed, but for example the average cooling speed from the bath temperature down to 370° C. may be 80° C./s or less. The other conditions of the plating step may be suitably set considering the thickness and amount of deposition of the plating layer, etc. For example, by dipping the cold rolled steel sheet in the plating bath, then pulling it out and immediately spraying it by $N_2$ gas or air using the gas wiping method and then cooling it, it is possible to adjust the amount of deposition of the plating layer to within a predetermined range, for example, to within a range of 10 to 170 $g/m^2$ per surface.

In the plated steel sheet produced by the present method of production, the ratio of the "Al concentration at center of plating layer"/"Al concentration at position of plating layer where Fe concentration is 50% of base steel sheet" is controlled to within a range of 0.10 to 1.50, and therefore the effect due to the addition of Al to the plating layer is sufficiently manifested and penetration of molten Zn to the inside of the steel sheet at the time of spot welding is suppressed or reduced and in turn it is possible to remarkably improve the LME resistance of the plated steel sheet. Therefore, according to such a plated steel sheet, it is possible to realize a better LME resistance compared with a conventional plated steel sheet provided with a plating layer having a similar chemical composition, more specifically a Zn-based plating layer having a similar Al content. It is possible to contribute to the development of industry through improvement of the collision safety and extension of service life in use as particularly a plated steel sheet for automobile.

Below, examples will be used to explain the present invention in more detail, but the present invention is not limited to these examples in any way.

EXAMPLES

In the following examples, plated steel sheets according to an embodiment of the present invention were produced under various conditions and the LME resistances of the produced plated steel sheets were investigated.

First, molten steels having chemical compositions comprised of, by mass %, C: 0.15%, Si: 1.00%, Mn: 2.60%, P: 0.010%, S: 0.0020%, N: 0.0100%, Al: 0.020%, and balances of Fe and impurities were cast by continuous casting to form steel slabs. The steel slabs were cooled once, then reheated to 1200° C. for hot rolling and then were coiled at 600° C. The hot rolling was performed by rough rolling and finish rolling. The end temperature of the finish rolling was 950° C. and the rolling reduction of the finish rolling was 30%. Next, the obtained hot rolled steel sheets were pickled, then were cold rolled by rolling reductions of 50% to obtain cold rolled steel sheets having sheet thicknesses of 1.6 mm. Next, the obtained cold rolled steel sheets were pretreated in a pH9.2 solution by running a current of a 5.0 $A/dm^2$ current density for 8 seconds. Next, in accordance with need, the cold rolled steel sheets were coated with a 2.0% NaOH aqueous solution, then a heavy duty grinding brush (D-100 made by Hotani Co., Ltd.) was used to grind down the surface of the cold rolled steel sheet by a 10 to 200 g/m² grinding amount, a brush screw-in amount of 2.0 mm, and a speed of 600 rpm to introduce strain to the surface of the cold rolled steel sheet. The use of grinding by a heavy duty grinding brush is as shown in Table 1 for the respective cold rolled steel sheets.

Next, each cold rolled steel sheet was cut to a 100 mm×200 mm size, then was annealed under conditions of a dew point of 0° C., a holding temperature of 870° C., and a holding time of 100 seconds (annealing atmosphere: hydrogen 4% and nitrogen balance). In all of the steel sheet samples, the rate of temperature rise at the time of annealing was 5° C./s. Next, the cut steel sheet sample was plated using a hot dip galvanization bath having a predetermined bath composition under conditions of the bath temperature, time from dipping in plating bath to start of cooling, and average cooling speed from the bath temperature to 370° C. shown in Table 1 to thereby obtain a plated steel sheet sample formed with a plating layer on both surfaces of the steel sheet sample. The amount of plating deposition was adjusted to 50 g/m² per surface by dipping in the plating bath, pulling up the steel sheet sample, and wiping by N₂ gas before starting cooling. In Comparative Examples 28 and 29, alloying was performed at respectively 520° C.×10 seconds and 570° C.×30 seconds after the hot dip galvanization.

[Analysis of Chemical Composition of Plating Layer]

The chemical composition of the plating layer was determined by dipping a sample cut to 30 mm×30 mm in a 10% HCl aqueous solution containing an inhibitor (Asahi Chemical Co., Ltd., Ibit), peeling off the plating layer by pickling, then measuring the plating constituent dissolved in the aqueous solution by ICP spectroscopy. The results are shown in Table 1.

[Tensile Strength of Plated Steel Sheet]

The tensile strength was measured by taking a JIS No. 5 test piece from an orientation at which a long direction of the test piece becomes parallel to perpendicular direction to rolling of the plated steel sheet sample and conducting a tensile test based on JIS Z 2241: 2011. As a result, in all of the plated steel sheet samples, the tensile strength was 780 MPa or more.

[Measurement of Al Concentration Distribution in Plating Layer]

First, a plated steel sheet sample was cut to a 50 mm×50 mm size. Next, the cut plated steel sheet sample was measured by GDS to thereby obtain the Al concentration distribution from the surface of the plating layer down to 100 μm in the depth direction. Next, the Al concentration measured by GDS at the depth position where the Fe intensity became 50% of the Fe intensity of the base steel sheet (Fe intensity at depth 100 μm position from surface of plating layer of sample) was determined as the "Al concentration at position of plating layer where Fe concentration is 50% of base steel sheet". The distance from this depth position up to the surface was defined as the thickness of the plating layer. The Al concentration obtained by GDS at the ½ position of that thickness of the plating layer was determined as the "Al concentration at center of plating layer". Finally, the ratio of the "Al concentration at center of plating layer"/"Al concentration at position of plating layer where Fe concentration is 50% of base steel sheet" was determined.

[Evaluation of LME Resistance by Spot Welding]

A 100×100 mm size plated steel sheet sample was subjected to spot welding. This was cut to 50 mm×100 mm sizes to prepare two sheets. These two plated steel sheet samples were spot welded using dome radius type tip diameter 8 mm welding electrodes, weld angle of 5°, squeezing force of 4.0 kN, weld time of 0.5 second, and weld current of 9 kA to fabricate a welded joint. Next, the weld of the prepared welded joint was polished in cross-section, then examined under an optical microscope, measured for length of LME cracking occurring at the cross-section of the weld, and evaluated for LME resistance as follows:

AAA: no LME cracking,

AA: LME cracking length of more than 0 μm to 100 μm,

A: LME cracking length of more than 100 μm to 500 μm,

B: LME cracking length of more than 500 μm

Cases where the LME resistance was evaluated as AAA, AA, and A were evaluated as plating steel sheet having improved LME resistance. The results are shown in the following Table 1.

TABLE 1

| No. | Class | Chemical composition of plating layer (mass %) | | | | | Grinding (heavy duty grinding brush) | Production conditions | | | | Al conc. at center of plating layer/Al conc. at Fe 50% plating layer position | LME resistance |
| | | Zn | Al | Fe | Element (Other) | (mass %) | | Bath temp. | Alloying heat treatment | Time from dipping in plating bath to start of cooling (s) | Average cooling speed from bath temp. to 370° C. (° C./s) | | |
|---|---|---|---|---|---|---|---|---|---|---|---|---|---|
| 1 | Ex. | Bal. | 0.10 | 0.30 | B | 0.001 | No | 450 | No | 6 | 20 | 0.15 | A |
| 2 | Ex. | Bal. | 0.20 | 0.40 | Mg | 0.200 | No | 450 | No | 6 | 20 | 0.19 | A |
| 3 | Ex. | Bal. | 0.25 | 0.40 | Y | 0.001 | No | 440 | No | 6 | 20 | 0.19 | A |
| 4 | Ex. | Bal. | 0.35 | 0.30 | Si | 0.0001 | No | 440 | No | 4 | 40 | 0.22 | AA |
| 5 | Ex. | Bal. | 0.45 | 0.30 | Pb | 0.0002 | No | 440 | No | 4 | 40 | 0.24 | AA |
| 6 | Ex. | Bal. | 0.50 | 0.20 | Ni | 0.001 | Yes | 440 | No | 4 | 40 | 0.32 | AAA |
| 7 | Ex. | Bal. | 0.50 | 0.30 | Sb | 0.001 | Yes | 440 | No | 4 | 40 | 0.31 | AAA |
| 8 | Ex. | Bal. | 0.50 | 0.30 | | | Yes | 440 | No | 4 | 40 | 0.31 | AAA |
| 9 | Ex. | Bal. | 0.50 | 0.30 | Ti | 0.010 | Yes | 440 | No | 4 | 40 | 0.31 | AAA |
| 10 | Ex. | Bal. | 0.55 | 0.50 | Ca | 0.002 | Yes | 440 | No | 4 | 40 | 0.30 | AAA |
| 11 | Ex. | Bal. | 0.55 | 0.70 | Ce | 0.0001 | Yes | 440 | No | 4 | 40 | 0.35 | AAA |

TABLE 1-continued

| | | Chemical composition of plating layer (mass %) | | | | | Production conditions | | | | Al conc. at center | |
| | | | | | Other | | Grinding (heavy duty | | Alloying | Time from dipping in plating bath to start of | Average cooling speed from bath temp.to | of plating layer/Al conc. at Fe 50% plating | |
| No. | Class | Zn | Al | Fe | Element | (mass %) | grinding brush) | Bath temp. | heat treatment | cooling (s) | 370° C. (° C./s) | layer position | LME resistance |
|---|---|---|---|---|---|---|---|---|---|---|---|---|---|
| 12 | Ex. | Bal. | 0.60 | 0.40 | Pb | 0.002 | Yes | 440 | No | 6 | 20 | 0.28 | AA |
| 13 | Ex. | Bal. | 0.60 | 0.50 | Sn | 0.001 | Yes | 440 | No | 4 | 40 | 0.31 | AAA |
| 14 | Ex. | Bal. | 0.60 | 0.50 | Nb | 0.002 | Yes | 440 | No | 4 | 40 | 0.31 | AAA |
| 15 | Ex. | Bal. | 0.60 | 0.50 | P | 0.0001 | Yes | 440 | No | 4 | 40 | 0.31 | AAA |
| 16 | Ex. | Bal. | 0.60 | 0.40 | Cu | 0.0001 | Yes | 440 | No | 4 | 40 | 0.35 | AAA |
| 17 | Ex. | Bal. | 0.80 | 0.50 | Mn | 0.010 | Yes | 440 | No | 4 | 40 | 0.49 | AAA |
| 18 | Ex. | Bal. | 0.90 | 0.20 | Cr | 0.001 | Yes | 430 | No | 4 | 40 | 0.55 | AAA |
| 19 | Ex. | Bal. | 1.30 | 0.10 | | | Yes | 430 | No | 6 | 20 | 0.29 | AA |
| 20 | Ex. | Bal. | 1.00 | 0.40 | Zr | 0.002 | Yes | 430 | No | 4 | 40 | 0.60 | AAA |
| 21 | Ex. | Bal. | 1.10 | 0.20 | Ag | 0.0001 | Yes | 430 | No | 4 | 40 | 0.75 | AAA |
| 22 | Ex. | Bal. | 1.20 | 0.50 | Mo | 0.001 | Yes | 430 | No | 4 | 40 | 0.89 | AAA |
| 23 | Ex. | Bal. | 1.30 | 0.40 | Sr | 0.010 | Yes | 430 | No | 4 | 40 | 1.12 | AAA |
| 24 | Ex. | Bal. | 1.40 | 0.50 | Li | 0.001 | Yes | 430 | No | 4 | 40 | 1.40 | AAA |
| 25 | Ex. | Bal. | 1.50 | 0.60 | La | 0.002 | Yes | 430 | No | 4 | 40 | 1.50 | AAA |
| 26 | Comp. ex. | Bal. | 0.05 | 0.70 | | | No | 450 | No | 6 | 20 | 0.05 | B |
| 27 | Comp. ex. | Bal. | 1.60 | 0.50 | | | No | 450 | No | 6 | 20 | 1.60 | B |
| 28 | Comp. ex. | Bal. | 0.30 | 2.40 | | | No | 450 | A | 6 | 20 | 0 | B |
| 29 | Comp. ex. | Bal. | 0.50 | 10.00 | | | No | 450 | B | 6 | 20 | 0 | B |
| 30 | Comp. ex. | Bal. | 0.30 | 0.20 | | | No | 450 | No | 8 | 20 | 0.01 | B |
| 31 | Comp. ex. | Bal. | 0.40 | 0.50 | | | No | 450 | No | 6 | 10 | 0.02 | B |

Underlines indicate outside scope of present invention or production conditions off from preferable range.

Referring to Table 1, in Comparative Example 26, the Al content of the plating layer as a whole was low, and therefore the effect of suppression of LME cracking by the addition of Al could not be sufficiently manifested and the LME resistance fell. In Comparative Example 27, the Al content of the plating layer as a whole was high, and therefore it is believed the melting point of the plating layer fell. As a result, at the time of spot welding, the Zn in the plating layer easily melted and the LME resistance fell. In each of Comparative Examples 28 and 29, due to the alloying treatment, the Fe content in the plating layer rose, the desired plating chemical composition and ratio of the "Al concentration at center of plating layer"/"Al concentration at position of plating layer where Fe concentration is 50% of base steel sheet" could not be obtained, and the LME resistance fell. In Comparative Example 30, the time period from dipping into the plating bath down to cooling start was long, and therefore it is believed a large amount of Al ended up being consumed for formation of the Fe—Al barrier layer and the amount of Al in the plating layer other than at the Fe—Al barrier layer ended up falling. As a result, the desired ratio of the "Al concentration at center of plating layer"/"Al concentration at position of plating layer where Fe concentration is 50% of base steel sheet" could not be obtained and the LME resistance fell. In Comparative Example 31, the average cooling speed from the bath temperature to 370° C. was slow, and therefore it is believed a large amount of Al ended up being consumed for formation of the Fe—Al barrier layer and the amount of Al in the plating layer other than at the Fe—Al barrier layer ended up falling. As a result, the desired ratio of the "Al concentration at center of plating layer"/"Al concentration at position of plating layer where Fe concentration is 50% of base steel sheet" could not be obtained and the LME resistance fell.

In contrast to this, the plated steel sheets of all of the examples had the predetermined plating chemical composition and controlled the ratio of the "Al concentration at center of plating layer"/"Al concentration at position of plating layer where Fe concentration is 50% of base steel sheet" to within a range of 0.10 to 1.50, and therefore the effect due to addition of Al to the plating layer could be sufficiently manifested and LME cracking could be reliably suppressed or reduced. In particular, in each of Examples 4 and 5 (no grinding by heavy duty grinding brush) where the Al content of the plating layer as a whole was 0.30% or more and the time from dipping the steel sheet in the plating bath to the start of cooling was 4 seconds and the average cooling speed from the bath temperature down to 370° C. was 40° C./s and in each of Examples 12 and 19 where the Al content of the plating layer as a whole was 0.30% or more and grinding was performed by a heavy duty grinding brush as pretreatment of the annealing step (however, where the time from dipping the steel sheet in the plating bath to the start of cooling was 6 seconds and the average cooling speed from the bath temperature down to 370° C. was 20° C./s), the ratio of the "Al concentration at center of plating layer"/"Al concentration at position of plating layer where Fe concentration is 50% of base steel sheet" became 0.20 or more and, as a result, the LME resistance was evaluated as AA and the LME resistance of the plated steel sheet was further improved. In addition, in each of Examples 6 to 11, 13 to 18, and 20 to 25 where the Al content of the plating layer as a whole was 0.30% or more, grinding was performed by a heavy duty grinding brush as pretreatment of the annealing step, and furthermore the time from dipping the steel sheet in the plating bath to the start of cooling was 4 seconds and the average cooling speed from the bath temperature down to 370° C. was 40° C./s, the ratio of the "Al concentration at center of plating layer"/"Al concentration at position of plating layer where Fe concentration is 50% of base steel sheet" became 0.30 or more and as a result the LME resistance was evaluated as AAA and the LME resistance of the plated steel sheet was further improved.

The invention claimed is:

1. A plated steel sheet comprising a base steel sheet and a plating layer formed on a surface of the base steel sheet, wherein the plating layer has a chemical composition comprising, by mass %, Al: 0.30 to 1.50%
Fe: 0.01 to 2.00%,
Mg: 0 to 1.500%,
Si: 0 to 1.000%,
Ni: 0 to 1.000%,
Ca: 0 to 4.000%,
Sb: 0 to 0.500%,
Pb: 0 to 0.500%,
Cu: 0 to 1.000%,
Sn: 0 to 1.000%,
Ti: 0 to 1.000%,
Cr: 0 to 1.000%,
Nb: 0 to 1.000%,
Zr: 0 to 1.000%,
Mn: 0 to 1.000%, Mo: 0 to 1.000%,
Ag: 0 to 1.000%,
Li: 0 to 1.000%,
La: 0 to 0.500%,
Ce: 0 to 0.500%,
B: 0 to 0.500%,
Y: 0 to 0.500%,
P: 0 to 0.500%,
Sr: 0 to 0.500%, and
a balance of Zn and impurities, wherein a total content of Mg, Si, Ni, Ca, Sb, Pb, Cu, Sn, Ti, Cr, Nb, Zr, Mn, Mo, Ag, Li, La, Ce, B, Y, P, and Sr in the chemical composition is 5.000% or less, and when measuring the plating layer by glow discharge spectroscopy (GDS), a ratio of "Al concentration, in mass %, at a center of the plating layer in a depth direction"/"Al concentration, in mass %, at a position of the plating layer where a Fe intensity is 50% of the Fe intensity of the base steel sheet" is 0.30 to 1.50, wherein the plating layer is a hot dip galvanized (GI) layer, and the plated steel sheet has a tensile strength, measured in accordance with JIS Z 2241:2011, of 780 MPa or more.

\* \* \* \* \*